Figure 1:
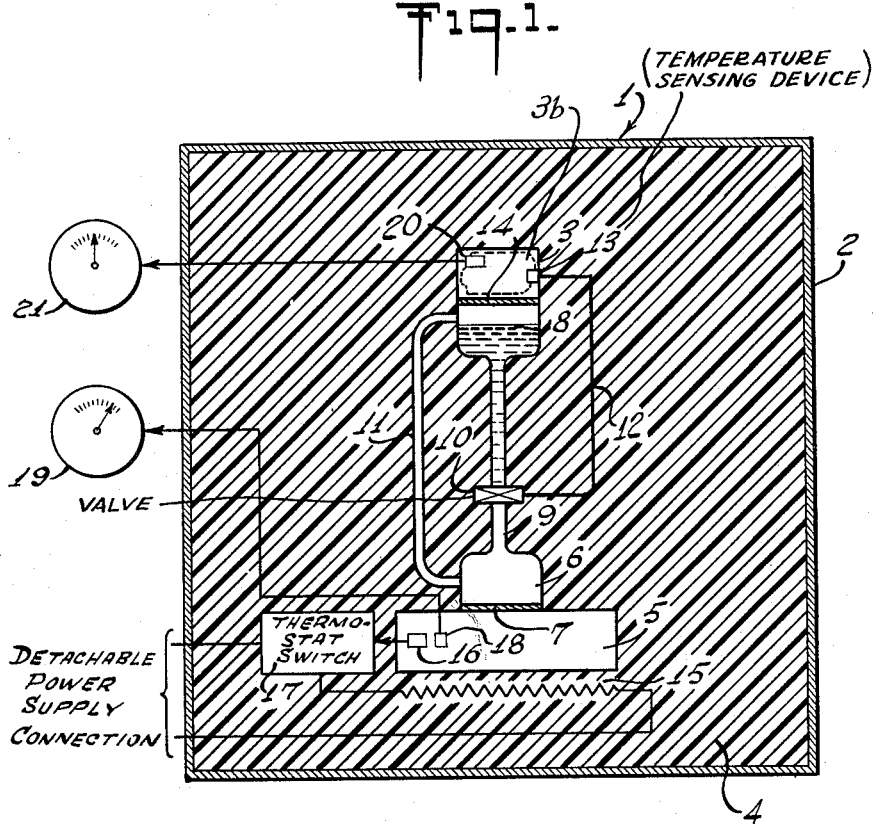

Dec. 3, 1963    C. D. SNELLING    3,112,877
SELF-CONTAINED CONTROLLED TEMPERATURE SYSTEM
Filed Feb. 15, 1961

INVENTOR
CHARLES D. SNELLING
BY
Roy C. Hopgood
ATTORNEY

United States Patent Office

3,112,877
Patented Dec. 3, 1963

3,112,877
SELF-CONTAINED CONTROLLED TEMPERATURE
SYSTEM
Charles D. Snelling, Breinigsville, Pa. (% Standard
Plastics Inc., Fogelsville, Pa.)
Filed Feb. 15, 1961, Ser. No. 89,530
8 Claims. (Cl. 236—1)

This invention relates to a self-regulating temperature control system and, in particular, to a method and apparatus for closely regulating over a given period of time the temperature of a temperature-sensitive object subject to the adverse influence of an outside environment characterized by a wide variation in ambient temperature.

Extremely delicate instruments, such as precision gyroscopes, are generally adversely affected by variations in ambient temperatures. Where these or similar instruments are employed as an essential part of an instrument package for use in devices subject to the influence of fluctuating ambient temperatures or in devices adapted to obtain scientific information of a particular environment, e.g. environmental probe devices, such instruments are generally standardized to a particular reference temperature. Unless extreme care is taken to maintain the delicate instrument as close as possible to its predetermined reference condition, or care taken to insure compensation for any adverse effect of the ambient environment, the delicate instruments may be rendered ineffectual or the device containing the instruments rendered practically useless for its intended purpose.

Although attempts have been made to protect the instruments or maintain them at their predetermined reference conditions, generally such attempts have led to the introduction of rather complicated temperature control devices. As far as I am aware, no simple method and/or apparatus has been proposed capable of providing a self-regulating system within the instrument package itself, particularly a system which will maintain constant conditions for a day or two, or even for at least a week, such as might be required in a short-time environmental probe device.

It is the object of my invention to provide a method and apparatus for closely regulating the temperature of a temperature sensitive object, such as a precision gyroscope.

Another object is to provide a dependable temperature regulation unit light weight in its construction and versatile in its application for use in systems subject to a wide range of fluctuating ambient temperatures, for example temperatures ranging from about —200° F. to about 150° F.

Still another object is to provide as a preferred embodiment a temperature control system which is self-regulating over a substantial long period of time and which system does not require the external application of energy to maintain its regulating effect.

A further object is to provide a self-regulating temperature system capable of regulating the temperature of a temperature-sensitive object to within closely held limits, such as within a few degrees, or even within 0.5° F. for a prolonged period of time, for example for at least a week.

Figure 2:
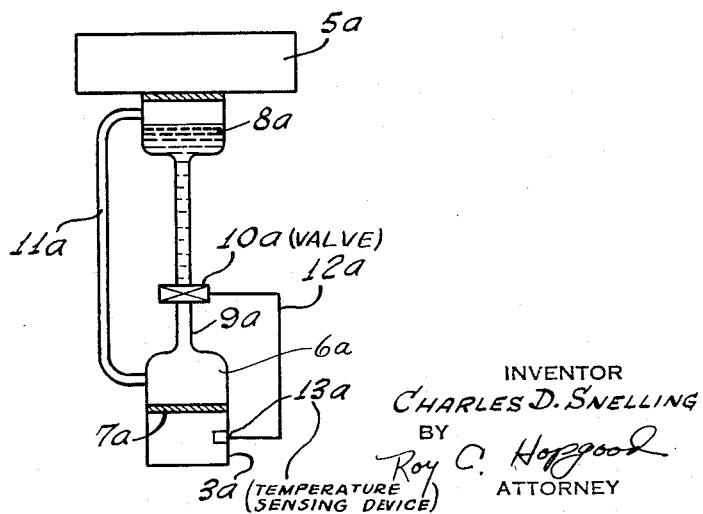

These and other objects will more clearly appear from the following description and the appended drawings, wherein:

FIG. 1 shows one embodiment of an apparatus adapted to carry out one method aspect of the invention, the system being one in which heat is added to the sensitive object in order to compensate for any temperature drop due to low ambient temperatures; and FIG. 2 depicts another embodiment provided by the invention showing a device similar to FIG. 1, with the insulation omitted for purposes of clarity, but differing in that the system is adapted to remove heat from the sensitive object due to an ambient temperature higher than that of the object to be protected.

According to my invention, I can produce a self-regulating system which will work over a prolonged period of time by employing a method comprising insulating the object to be protected from the ambient environment under substantially adiabatic conditions, providing a heat-energy storage device or heat sink also similarly insulated from said environment and said object, providing a connectable path of heat flow between said object and said heat sink, producing a sensing signal corresponding to the temperature within the immediate environment of the object, connecting said path of heat flow between said object and said heat sink and varying the amount of heat flow along said path between said object and said heat sink in accordance with the sensing signal to maintain the temperature of the object at its predetermined level. In this way, I add just enough heat to make up for the slight loss through the insulation.

I have found that by utilizing a system under substantially adiabatic conditions, that is a system in which the heat loss to or heat gain from the ambient environment is kept to a minimum, I am able to provide a very simple self-regulating system capable of operating for a prolonged period of time without the external application or removal of heat energy, be it a day, several days, or for at least a week. By substantially adiabatic conditions, I have in mind heat energy systems in which, at worst, the rate of temperature drop of the temperature-sensitive object is maintained by means of insulation below one-half degree F. per minute and preferably below one-quarter degree F. per minute, or in which the rate of temperature rise of the object is maintained below one-quarter degree F. per minute and preferably below one-tenth degree F. per minute, over ambient temperatures fluctuating within the somewhat extreme range of about —200° F. to 150° F. Generally speaking, under the conditions in which my system normally works, the adiabatic condition is such that the temperature drop or gain does not exceed more than 1 or 2° F. per hour. Under such conditions, I am able to maintain the temperature constant for an extended time period.

I find by preferably working under the foregoing conditions and by preferably using a fluid as the heat transfer medium to or from the heat sink and the object that very sensitive temperature regulation obtains within about plus or minus 0.5° F. In its broad aspects, the apparatus (note FIGS. 1 and 2) employed in carrying out the invention comprises a heat sink spacially related to and at a temperature different from that of the object to be regulated (by heat sink I mean a heat energy storage device capable of adding or extracting heat from an object in order to maintain its temperature constant), means for insulating the object and said heat sink from each other and from the ambient temperatures under substantially adiabatic conditions, heat transfer means adapted to be coupled to said heat sensitive object, means for coupling said heat transfer means to effect heat flow therethrough and temperature sensing means associated with said object for actuating said coupling means.

As illustrative of the foregoing, reference is made to FIG. 1 which shows an instrument package designated generally by the numeral 1 comprising an outer casing 2 of metal, wood, plastic or the like, and showing packed within it only that portion of the system required to describe the invention. Contained within the package is a temperature-sensitive object (not shown) confined within container 3 completely surrounded and supported by insulation 4 (partially shown for purposes of clarity) of, for example, plastic foam, preferably urethane foam of very low heat conductivity, the thickness of insulation as measured from the surface of object container 3 to the periphery of the package being at least sufficient to effect for the purposes of the invention substantially adiabatic conditions within the package. Spacially associated with the object is a heat sink 5, which in this embodiment is at a temperature higher than that of the object and whose heat content is substantially higher than that of the object. In association with the object and the heat sink, I preferably provide a fluid heat transfer system comprising an evaporator 6 in heat conductive contact with the heat sink via metal interface 7, for example copper, said evaporator being connectably coupled to condenser 8 via a flexible hermetically sealed fluid return tube 9 of copper, rubber, neoprene, polyethylene or other material under conditions of relatively poor heat conductivity through a controlled valve release 10 and through heat transfer tube 11 also of polyethylene or other material employed under conditions of relatively poor heat conductivity. Condenser 8 contains a heat transfer fluid, for example, a refrigerant, preferably Freon 11 or 113. A temperature sensing device is sometimes provided indicated generally by dotted lines 12, or the device may be pressure sensitive as affected by temperature change, the sensing portion 13 of the device being located in one embodiment at the interface of container 3 and the plastic foam, the control portion being associated with conventional means at valve 10 for opening and closing said valve when the temperature of the object varies from its standard reference temperature. The means for actuating the valve may be any standard device normally used for that purpose such as a bulb or bellows controlled valve, or means which react to the changes in vapor pressure of the heat transfer fluid, or an element capable of expanding or contracting in response to heat changes, such as a wax pellet, or in short any device having thermostatic properties.

The container 3 of the object is in heat conductive conatct with condenser 8 at interface 14, preferably of copper, or other material of good heat conductivity, in order to insure immediate heat transfer to or from the object in controlling the temperature thereof.

In setting up the system to maintain a constant temperature of about 70° F. for the object, I provide an hermetically sealed heat transfer fluid system evacuated to a convenient pressure corresponding to any desired operating temperature, for example, 70° F. Thus, a given heat transfer liquid can be adapted through pressure control within an hermetically sealed unit to operate at any given temperature or temperature range. A given amount of the liquid would be placed hermetically in condenser 8 with valve 10 closed and evacuated to a desired pressure. I then provide a heat sink with a temperature higher than that of the object, for example 100° F., spacially related to the object as shown in FIG. 1. The system is well insulated with material of low heat conductivity, preferably a urethane plastic foam having a density in the neighborhood of about 2 lb./cu. ft. I find for my purposes and under the conditions my system is generally adapted to operate that the object as well as the heat source may be insulated from the ambient environment by an insulation thickness of about 2 to 8 inches or greater in providing a substantially adiabatic condition.

Assuming that the temperature sensing device is set to detect a temperature drop of 0.5° F. and greater and the temperature has dropped, let us say, to 69° F., the valve is actuated by sensing device 12 to release liquid into evaporator 6 where it immediately flashes into a vapor, absorbs heat from the heat sink, leaves the evaporator through heat transfer tube 11, condenses in condenser 8 to release its heat of vaporization, which heat is transferred via metal interface 14 to container 3 and to the instrument until the temperature at 13 reaches 70° F. following which the valve is closed automatically. Since no more liquid is fed to evaporator 6, heat transfer to the object ceases until additional heat is called for, whereby the cycle is repeated. Actually, the system tends to modulate and will establish an equilibrium condition appropriate to the heat flow rate called for.

In providing a system which will operate for a prolonged period of time, I prefer a built-in heat source in which the heat available to do the desired work is derived from the heat of fusion of a molten compound or derived from the heat of solution of a chemical compound, such as the heat of solution in water.

Examples of substances which may be used in the fused state as a heat source are naphthalene ($C_{10}H_8$), cyanamide ($H_2NCN$), succinic anhydride [$(CH_2CO)_2O$], hydrated sodium chromate ($Na_2CrO_4 \cdot 10H_2O$), hydrated sodium dibasic phosphate ($Na_2HPO_4 \cdot 12H_2O$), magnesium nitrate ($Mg(NO_3)_2$), etc.

Naphthalene which melts at about 184° F. exhibits a heat of fusion of about 64 B.t.u./lb. Cyanamide melts at about 109.4° F. and has a heat of fusion of about 89 B.t.u./lb. Sodium chromate melts at about 73.4° F. and exhibits a heat of fusion of about 70 B.t.u./lb. Sodium dibasic phosphate melts at about 96.8° F. and on solidifying gives off about 120 B.t.u./lb. of salt.

Where a substance with a particular melting temperature is desired to suit a particular system, low melting eutectic mixtures may be employed. Details as to such mixtures need not be gone into here, such information being readily available in the literature.

As stated above, the heat source may also be based on heats of solution. The solution of sodium oxide ($Na_2O$) in water would be one example. The solution of 1 mole of $Na_2O$ in 99 moles of water will yield about 56.39 kg. calories which corresponds to about 224 B.t.u.'s. Or the heat of solution may be derived from the solution of 1 mole of $AlCl_3$ in water to obtain upwards of 77.9 kg. calories, corresponding to 309 B.t.u.'s. As will be appreciated, a system based on heats of solution is not reversible as in the system where molten salts are used. In the case of the molten salts discussed hereinabove, these salts can be remelted in situ after solidification and thus be used over again without the necessity of re-charging.

Examples of heat transfer fluids together with the heats of vaporization which may be employed in carrying out the invention are given in the following table:

| Name | Formula | Temp., ° F. | Heat of Vaporization, B.t.u./lb. |
| --- | --- | --- | --- |
| Acetone | $(CH_3)_2CO$ | 133.5 | 225 |
| Benzene | $C_6H_6$ | 176.0 | 170 |
| Carbon Tetrachloride | $CCl_4$ | 170.0 | 83 |
| Ethyl Alcohol | $C_2H_5OH$ | 173.0 | 366 |
| Ethyl Ether | $(C_2H_5)_2O$ | 94.5 | 150 |
| Freon 11 | $CCl_3F$ | 75.3 | 78 |
| Freon 113 | $CCl_2F-CClF_2$ | 117.6 | 63 |

Of course, it will be appreciated that these heat transfer fluids are not limited in use to the temperatures indicated since they can be adapted for any desired temperature in accordance with the pressure prevailing within the hermetically sealed heat transfer device.

Assuming a system in which the sensitive instrument and its container weighs about 5 lbs. (with average specific heat of about 0.1) and is to be maintained at a temperature of about 70° F. in an ambient environment of about 20° F., I would employ a heat reservoir designed as a thermos vessel containing about 10 lbs. of molten cyanamide at a temperature of about 120° F. Assuming in addition that the system is substantially adiabatically insulated from the ambient temperature so that at the outside the object may drop in temperature at the rate of about 0.03° F./minute, the extent to which the system may be self-regulating can be readily estimated.

The amount of heat given up by the object each minute would come to about 0.015 B.t.u. (mass × sp. H. × temp. drop). Ten pounds of cyanamide are capable of giving off 10 × 89 or 890 B.t.u.'s on solidification. Ignoring the fact that the molten cyanamide also has additional source of heat by virtue of its temperature being higher than that of the object, the latent heat of fusion itself would supply enough heat, assuming 100% efficiency of heat utilization, to maintain the temperature of the object substantially constant for a prolonged period of time. Dividing 890 by 0.015, the heat given off through solidification would theoretically be sufficient to control the temperature for almost 60,000 minutes or 1000 hours. Assuming only 20% heat transfer efficiency, the heat derived by solidification alone would be at least sufficient to control the object temperature for about 200 hours or for over a week.

It is apparent from the foregoing that highly versatile self-contained control systems are possible with my invention. Where it is known beforehand that the object is to operate in an environment in which the temperature is higher than the sensitive object, then I would employ a system the reverse of that shown in FIG. 1. Referring to FIG. 2, such a system is shown with object container $3a$ in heat conductive contact with evaporator $6a$ through a metal plate $7a$, preferably of copper. The evaporator is similarly connectably coupled to condenser $8a$ through fluid return tube $9a$ of polyethylene or other material of relatively poor heat conductivity through controlled valve release $10a$ and through heat transfer tube $11a$ also of polyethylene or other material of relatively poor heat conductivity. A temperature sensing device $12a$, e.g. a thermostatic control device or bulb, is similarly provided for controlling valve $10a$. Condenser $8a$ is associated with heat sink $5a$, for example, a block of copper or other heat absorber, which would be at a temperature substantially below that of the object, condenser $8a$ being in contact with said heat sink. Assuming object $3a$ increases in temperature by several degrees above its standard reference temperature, sensing device $12a$ would cause valve $10a$ to open and drop fluid into $6a$ where it is flashed and the vapor formed removed via tube $11a$ to condenser $8a$ where the vapor condenses to give up heat to heat sink $5a$, the cycle continuing until the object reaches its reference temperature.

For optimum operation of the system, the heat sink should be insulated as efficiently as possible from the object, particular care being taken to insulate the object as adiabatically as possible from the ambient environment. Thus, the heat transfer means shown in FIGS. 1 and 2 should be relatively poor heat conductors. In other words for controllability, conditions tending towards excessive heat conductivity should be avoided. The evaporator and the condenser may be constructed of cooper or other material. Whatever the material, the association between the heat sink (as in 2) and the object (as in 14) should be in good heat conductive relationship. As stated hereinbefore, the fluid-conducting tubes may be preferably constructed of copper. Other materials which may be employed are nylon, steel, polyethylene, glass, etc.

The insulation which may be employed in maintaining the system as close to adiabatic as possible may be one whose heat conductivity in British units ranges up to about 0.5 B.t.u./hr./sq. ft./° F./in. or from 0.2 to 0.5. As has been stated, I prefer to use urethane plastic foam which comes in various densities ranging from about 1 to 20 lbs. per cubic foot, e.g. 2 lbs./cu. ft., with heat conductivities varying with density up to about 0.3 B.t.u./hr./sq. ft./° F./in. I have found that foams of very low density, e.g. as low as 2 lbs./cu. ft., and of heat conductivities in the neighborhood of about 0.2 to be very useful in carrying out my invention. For my purposes urethane foam materials are particularly adaptable as they can be foamed in place whereby to provide a vibration-resistant support for the temperature control system.

Vinyl foams may also be employed. Certain other insulating materials of rather low heat conductivity may be used, such as cotton wool ($K=0.136$), hair felt ($K=0.36$), mineral wool ($K=0.27$), and the like, not to mention cork, santocel, glass wool, etc.

When insulating the temperature-sensitive object, it is desirable that the temperature of the insulation initially be very close and preferably equal to that of the object. In this way I am able to start with a system that is initially adiabatic in principle so that the object will not be subject to any rapid falling off in temperature, particularly where the insulation is at least thick enough to inhibit a rapid loss in heat content.

In certain instances, a situation may arise wherein the heat in the heat storage device spends itself before or even after the device has been put into use. Therefore, as a preferred embodiment, I may provide a thermostatically controlled heat charging means of, for example, the type shown schematically in FIG. 1 comprising an electric heating element 15 in heat conductive relationship with heat sink 5, the heating element being connected to a detachable power supply source outside the package. A thermostat-sensing element 16 would be provided in the heat storage region 5 in cooperative relationship with thermostat 17 for actuating said heating elements when the temperature of the heat storage device drops below a particular value. Additional thermostat-sensing elements 18 and 20 may also be provided in heat storage device 5 and in heated region 3, respectively, so that the instantaneous condition of the vital parts of the container may be continuously monitored on one of the outside faces of the instrument package. For example, assuming that the salt contained in heat sink 5 is one known commercially as Transit Heet 150 (trisodium phosphate and water) and that it has solidified, thermostat 17 would be set so that sufficient heat would be added to heat storage device 5 to melt the salt, which melts between 150 and 155° F., and cut off when the temperature of the salt has reached the neighborhood of about 165° to 180° F. Of course, it will be appreciated that numerous and multiple ways may be provided for applying heat to the heat storage device. For example, an hermetically sealed unit may be employed comprising an arrangement of tubing conducting hot water or steam vapor heated by a built in Calrod unit detachably connectable to an outside power source.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a system for controlling the temperature of a temperature-sensitive precision instrument tending to lose its heat to an environment cooler than said instrument the combination comprising, a precision instrument means containing and supporting the precision instrument, a heat reservoir spacially related to and at a tempearture greater than that of the precision instrument to be regulated, said heat reservoir comprising a chemical bath characterized by a relatively high heat content, insulation associated with said precision instrument and said heat reservoir for insulating them from each other and from said environment under substantially adiabatic conditions, the precision instrument being considered the cool portion of the system and said reservoir being considered the hot portion thereof, an evaporator in direct heat-conductive relation with said heat reservoir, a condenser in heat-conductive relation with the means containing and supporting said precision instrument, a fluid-return tube connectably coupling said evaporator and said condenser via a valve means, a heat transfer fluid in the condenser related to said precision instrument and adapted to be controllably fed to the hot portion of the system via the valve means of said fluid-return tube, a fluid-transfer tube also coupling said evaporator to said condenser, and temperature-sensing means thermally associated with said precision instrument for actuating said valve means for controllably feeding said fluid from the cool portion of the system to the heat reservoir evaporator in accordance with the temperature at which it is desired to control said precision instrument.

2. The device of claim 1, wherein said chemical bath is one having a relatively high heat of fusion.

3. The system of claim 2, wherein there is provided means in cooperable association with the heat reservoir for regenerating the heat source by applying heat of fusion to the chemical contained in said reservoir.

4. An instrument package adapted with self-regulating temperature means for controlling the temperature of a temperature-sensitive precision instrument tending to lose its heat to an environment cooler than said precision instrument which comprises, a container having insulatedly packed therein a temperature-sensitive precision instrument and a heat reservoir spacially related thereto and at a temperature greater than that of the precision instrument, the insulation in said package being effective to resist vibration and being at least sufficient to insulate said precision instrument and said heat reservoir from each other and from the environment under substantially adiabatic conditions, an evaporator in direct heat-conductive relation with said heat reservoir, a condenser in heat-conductive relation with said precision instrument, fluid-conducting means within said package adapted to be coupled to said condenser and said evaporator, a heat transfer fluid in said condenser and adapted to be controllably fed to the evaporator of the heat reservoir for removing heat therefrom, means for coupling said fluid-conducting means, and temperature sensing means associated with said precision instrument for actuating said coupling means for controllably feeding the fluid from the condenser to the evaporator of the heat reservoir to remove heat therefrom in accordance with the temperature at which it is desired to control said precision instrument.

5. An instrument package adapted with self-regulating temperature means for controlling the temperature of a temperature-sensitive precision instrument tending to lose its heat to an environment cooler than said precision instrument which comprises, a container having insulatedly packed therein a temperature-sensitive precision instrument and a heat reservoir spacially related thereto and at a temperature greater than that of the precision instrument, the insulation in said package being effective to resist vibration and being at least sufficient to insulate said precision instrument and said heat reservoir from each other and from the environment under substantially adiabatic conditions, said heat reservoir comprising a chemical bath characterized by a relatively high heat content, heat transfer means within said package comprising an evaporator in direct heat-conductive relation with said heat reservoir, a condenser in heat-conductive relation with said precision instrument, a fluid-return tube coupling said evaporator and said condenser via a valve means, a heat-transfer fluid in said condenser and adapted to be controllably fed to the evaporator of the heat reservoir for removing heat therefrom, a fluid-transfer tube also coupling said evaporator to said condenser, and temperature-sensing means associated with said precision instrument for actuating said valve means for controllably feeding said fluid in the condenser to the heat reservoir evaporator in accordance with the temperature at which it is desired to control said precision instrument.

6. The package of claim 5, wherein said chemical bath is one having a relatively high heat of fusion.

7. The instrument package of claim 6, wherein there is provided means in cooperable association with the heat reservoir for regenerating the heat source by applying heat of fusion to the chemical contained in said reservoir.

8. In a system for controlling the temperature of a temperature-sensitive precision instrument tending to lose its heat to an environment cooler than said precision instrument the combination comprising, a precision instrument, a heat reservoir spacially related to and at a temperature greater than that of the precision instrument to be regulated, said heat reservoir comprising a chemical heat storage material characterized by a relatively high heat of fusion, insulation surrounding said precision instrument and said heat reservoir for insulating them from each other and from said environment under substantially adiabatic conditions, the precision instrument being considered the cool portion of the system and said reservoir being considered the hot portion thereof, an evaporator in direct heat-conductive relation with said heat reservoir, a condenser in heat-conductive relation with said precision instrument, a fluid-transfer tube coupling said evaporator to said condenser, a fluid-return tube coupling said condenser to said evaporator, a heat transfer fluid in the condenser associated with said precision instrument and adapted to be fed to the hot portion of the system via said fluid-return tube, and a thermostatically operable valve in said fluid-return line for controllably feeding said fluid from the condenser to the evaporator when the temperature of the precision instrument varies from its standard reference temperature.

References Cited in the file of this patent
UNITED STATES PATENTS

| | | |
|---|---|---|
| 1,679,432 | Lyon | Aug. 7, 1928 |
| 1,703,803 | Widstrom | Feb. 26, 1929 |
| 1,991,276 | Gebhard | Feb. 12, 1935 |
| 2,044,609 | Hedlund | June 16, 1936 |
| 2,181,726 | Fiene | Nov. 28, 1939 |
| 2,289,007 | Gessler | July 7, 1942 |
| 2,620,788 | Rivoche | Dec. 9, 1952 |
| 2,791,204 | Andrus | May 7, 1957 |
| 2,808,494 | Telkes | Oct. 1, 1957 |

FOREIGN PATENTS

| | | |
|---|---|---|
| 492,724 | Great Britain | Sept. 26, 1938 |